UNITED STATES PATENT OFFICE.

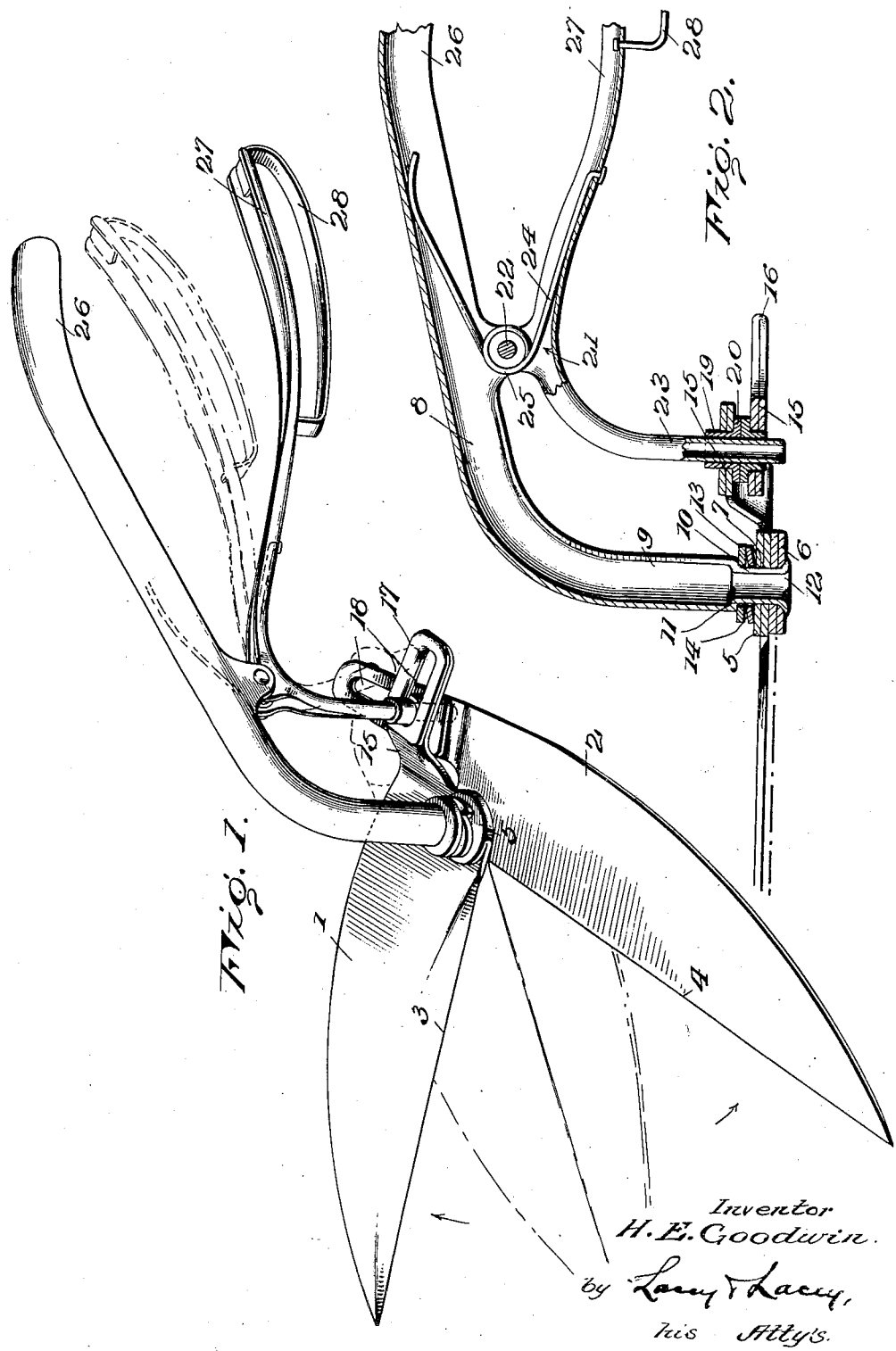

HARLEY E. GOODWIN, OF WASHINGTON, DISTRICT OF COLUMBIA.

SHEARS.

1,354,968.

Specification of Letters Patent.

Patented Oct. 5, 1920.

Application filed July 31, 1919. Serial No. 314,404.

*To all whom it may concern:*

Be it known that I, HARLEY E. GOODWIN, a citizen of the United States, residing at Washington, District of Columbia, have invented certain new and useful Improvements in Shears, of which the following is a specification.

This invention relates to improvements in shears and more particularly to that general type employed in cutting or trimming grass such as the edges of lawns after mowing or for cutting or trimming hedges and the like.

The ordinary types of shears employed for this purpose are well-known to be tiresome to use and this I believe to be due to the fact that the operating handles are located in the same plane with or a plane parallel to the plane of the cutting blades so that when the blades are horizontally disposed, the hand must assume a position which is tiring to the muscles in operating the handles. Therefore it is the primary object of the present invention to provide in shears of this type, an arrangement whereby the operating handles for the blades are positioned and operate in a plane perpendicular to the plane occupied by the blades so that in the use of the shears the hand is held in the most natural position and in which position the muscles will not be unduly strained in operating the handles.

The invention also resides in certain details of structure which permit of the shears being manufactured at a low cost and which render them durable, smooth in their operation, and unlikely to become disarranged.

In the accompanying drawings:

Figure 1 is a perspective view of a pair of shears constructed in accordance with the invention;

Fig. 2 is a detail vertical longitudinal sectional view through the shears.

In the drawings the blades of the shears are indicated in general by the numerals 1 and 2, these blades being provided with cutting edges indicated by the numerals 3 and 4 respectively. The blades are preferably made of sheet metal and the adjacent edges of the blades 1 and 2 are formed, near the inner ends of the blades, with ears indicated by the numerals 5 and 6 respectively, the ear 5 being bent back upon the upper side of the blade 1 and the ear 6 being bent back against the under side of the blade 2. The blades and their ears are formed with openings 7 and when the blades are assembled these openings register in the manner shown in Fig. 2.

The shears include a fixed handle member which is indicated in general by the numeral 8 and which constitutes the support for the blades 1 and 2. the forward end portion of this member being turned downwardly, as indicated by the numeral 9, and formed with a reduced extremity 10 defining a shoulder 11. The extremity 10 is pivotally fitted through the openings 7 and the lower end thereof is flanged or expanded as at 12 so as to permanently unite the parts. A washer 13 is fitted onto the reduced portion 10 of the handle 8 and bears against the shoulder 11, and a spring washer 14 is also fitted onto this portion of the handle member and bears between the washer 13 and the ear 5 of the blade 1. The spring washer 14 serves to yieldably hold the blades 1 and 2 in such position as to insure of proper coaction of their cutting or shearing edges and also serves to automatically take up any wear between the parts. However, the handle member 8 is preferably hollow, especially at its portions 9 and 10, so that in the event the parts become loosened to too great an extent, an expanding tool may be operated in the end 12 of the said member so as to further expand the same and shorten the portion 11 and thus take up the loose fit between the parts.

In order that the blades may be caused to coact through movement upon their pivot, means is provided which will now be described. Each of the blades is formed with a shank portion 15 which is initially relatively long and which, in the manufacture of the blade, is folded over upon itself between its ends as indicated by the numeral 16 so as to provide a relatively thick bearing portion 17, and this portion of each blade shank is formed with a longitudinally extending slot indicated by the numeral 18. The said portions 17 of the shanks of the two blades overlap with their slots 18 crossing, and bushings 19 are fitted through the slots 18 and are provided at their adjacent ends with flat circumscribing heads 20 which meet face to face, as shown in Fig. 2 of the drawings, the bushings being independently rotatable and their heads constituting means for suitably spacing the shanks of the two blades as well as retaining the bushings within their respective slots. The movable handle of the operating device is indicated in general by the numeral 21 and this handle is connected by means of a pivot pin 22 with the fixed handle member 18, the handle member 21 extending beneath the handle member 8 and the two members therefore occupying a common plane and which plane is perpendicular to the plane occupied by the blades 1 and 2. The handle 21 is provided with a downwardly turned forward end portion 23, which at its extremity fits through the bushings 19, as clearly shown in Fig. 2, the bushings being, of course, rotatable upon this portion of the handle and connection being in this manner established between the handle and shanks of the blades. A spring 24 is coiled as at 25 about the pivot pin 22 and its terminal portions bear against the inner sides of the handle members 8 and 21 to the rear of the said pivot pin. Normally this spring serves to hold the handle member 21 swung to such position with relation to the handle member 8 that the bushings 19 will engage in the forward ends of the slots 18 in the shanks of the blades and thus the blades will be normally held in the open position shown in Fig. 1 of the drawings. However, when the handle member 21 is swung upwardly upon its pivot, the bushings will ride rearwardly in the slots and as the shanks of the blades cross one another and extend diagonally in opposite directions, this movement of the bushings in the slots in the shanks will cause the blades to function upon their pivot in a manner to cause their cutting or shearing edges to coact, the spring 34 serving, of course, to return the handle member 21 and the blades 1 and 2 to normal position when the pressure is relieved. To provide for ready and convenient operation of the handle member 21, the member 8 is provided with a rounded grip portion 26 and the handle member 21 is provided with a similar portion 27, this latter handle member being also preferably provided with a guard or hand hold 28 upon its under side through which the fingers of the hand may be passed in grasping the handle members.

While the drawings illustrate and I have above described a specific form of connection between the handle member 21 and the blades to provide for operation of the latter, it will be understood that various other connections might be equally as well employed so far as the primary object of the invention is concerned, namely to provide for location and operation of the actuating means for the blades in a plane substantially perpendicular to the plane occupied by the blades so as to render the use of the device more convenient and less tiring. Also it will be understood that there are various other spring arrangements which might be employed for normally holding the handle member 21 in such position that the blades will be held in open position, and in fact some direct means for accomplishing this result may be employed. It will also be evident that by turning over the ears 5 and 6 and folding the shank portions of the blades upon themselves, the blades at these points are suitably thickened and reinforced so that the fixed and slidable pivotal connections will have ample bearing and there will be less likelihood of looseness in the parts in operation of the device.

Having thus described the invention, what is claimed as new is:

1. In an implement of the class described, coacting blades, and coextensive handles having direct connection with said blades for supporting and actuating the same and operating in a plane substantially perpendicular to the plane of the blades.

2. In an implement of the class described, coacting blades, and actuating means for the blades comprising a relatively fixed handle member supporting the blades, and a pivotally movable handle member coextensive with said fixed handle member and operatively connected with the blades, the said handle members occupying a plane substantially perpendicular to the plane of the blades.

3. In an implement of the class described, coacting blades, a relatively fixed handle member pivotally supporting the blades, the blades having intersecting shank portions, and a movable handle member pivotally operating in a plane with the fixed handle member and having direct operative connection with the said shank portions of the blades, the said plane being substantially perpendicular to the plane of the blade.

4. In an implement of the class described, a relatively fixed handle member, blades pivotally supported thereby and having intersecting slotted shank portions, and an operating handle pivotally mounted upon the first mentioned handle member and having an integral portion thereof working in the slots of the said shank portions of the blades.

5. In an implement of the class described, a relatively fixed handle member having a downwardly turned forward portion formed with a terminal pivot, coacting blades mounted upon the said pivot, the blades having intersecting slotted shank portions extending rearwardly of the pivot, and a movable handle member pivotally mounted upon the first mentioned handle member and having a downwardly extending forward portion working in the said slots in the said shank portions of the blades.

6. In an implement of the class described, a relatively fixed handle member having a downwardly extending forward portion reduced to provide a shoulder and a pivot, coacting blades fitted upon the pivot, a spring element bearing between the upper blade and the shoulder, the pivot beneath the blades being expanded, and means for actuating the blades.

7. In an implement of the class described, coacting blades provided with overturned extensions providing reinforced portions, the blades being formed through their said portions with pivot openings and being disposed with their said openings in registration, a pivot element fitted through the openings, and means for actuating the blades.

8. In an implement of the class described, coacting pivoted blades having shank portions overturned upon themselves to provide bearing portions, the said bearing portions intersecting and having slots formed therein, bushings fitted in the slots and independently rotatable and provided at their adjacent ends with contacting heads to prevent displacement and to relatively space the said bearing portions of the shank, and an actuating handle member having a terminal portion fitting through the bushings.

In testimony whereof I affix my signature.

HARLEY E. GOODWIN. [L. S.]